(12) United States Patent
Gurung et al.

(10) Patent No.: US 10,409,442 B1
(45) Date of Patent: Sep. 10, 2019

(54) INFORMATIVE TIPS FOR MOBILE DEVICES

(71) Applicant: INTUIT INC., Mountain View, CA (US)

(72) Inventors: Anukul Gurung, Mountain View, CA (US); Ashley Fernandes, Mountain View, CA (US); Christopher T. Bush, Mountain View, CA (US); Seon Mee Kong, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 140 days.

(21) Appl. No.: 15/337,317

(22) Filed: Oct. 28, 2016

(51) Int. Cl.
| | |
|---|---|
| *G06F 17/20* | (2006.01) |
| *G06F 3/0481* | (2013.01) |
| *G06F 3/0484* | (2013.01) |
| *G06F 3/0488* | (2013.01) |
| *G06F 9/451* | (2018.01) |

(52) U.S. Cl.
CPC ........ *G06F 3/0481* (2013.01); *G06F 3/04842* (2013.01); *G06F 3/04886* (2013.01); *G06F 9/453* (2018.02)

(58) Field of Classification Search
CPC .............................. G06F 3/04886; G06F 9/453
USPC .................................................. 715/705–715
See application file for complete search history.

(56) References Cited

U.S. PATENT DOCUMENTS

| | | | |
|---|---|---|---|
| 2013/0097500 A1* | 4/2013 | Rajagopal | G06F 9/453 715/711 |
| 2016/0170636 A1* | 6/2016 | Lee | G06F 3/04817 715/773 |
| 2017/0052703 A1* | 2/2017 | Bi | G06F 3/04897 |
| 2017/0109039 A1* | 4/2017 | Lemay | G06F 3/04886 |

* cited by examiner

*Primary Examiner* — Keith D Bloomquist
(74) *Attorney, Agent, or Firm* — Patterson + Sheridan, LLP (57) ABSTRACT

The present disclosure includes techniques for presenting an informative tip on a mobile device. In one embodiment, the method includes generating and presenting an informative tip upon receiving, at an application, a selection by a user of a text field in a user interface displayed on the mobile device. The application retrieves a size of a display of the mobile device and a location and a size of a virtual keyboard of the mobile device from data stored on the mobile device and determines a location on the mobile device display to present an informative tip based on the retrieved mobile device display size and the retrieved virtual keyboard location and size. The application generates an informative tip that includes text content corresponding to the text field and presents the generated informative tip as a pop-up display in the determined location.

20 Claims, 6 Drawing Sheets

INFORMATIVE TIPS FOR MOBILE DEVICES

BACKGROUND

Field

The present disclosure generally relates to informative tips provided to software application users. More specifically, the present disclosure relates to tailoring informative tips for mobile devices.

Related Art

Software applications typically include forms presented on a computer display. Such forms are often provided in a user interface which also includes multiple text fields for data entry. A backend application can provide relevant information to a user depending on which text field is selected by the user. For example, relevant information may be displayed to the side of a text field on a display when the user selects the text field. When the user selects a different text field, new information relevant to that text field may be displayed to the side of the newly selected text field.

Informative tips designed for typical computer displays often cannot be similarly used for mobile devices because the size of a typical mobile device display is considerably smaller than a typical computer display and does not allow space for the same information to be provided in the same location as provided on a computer display. The amount of information that can be presented on a mobile device, and the location of the presented information, is constrained by the size of the mobile device display screen.

SUMMARY

One embodiment presented herein includes a computer-implemented method for presenting an informative tip on a mobile device. The method includes generating and presenting an informative tip upon receiving, at an application, a selection by a user of a text field in a user interface displayed on the mobile device. The application retrieves a size of a display of the mobile device and a location and a size of a virtual keyboard of the mobile device from data stored on the mobile device and determines a location on the mobile device display to present an informative tip based on the retrieved mobile device display size and the retrieved virtual keyboard location and size. The application generates an informative tip that includes text content corresponding to the text field and presents the generated informative tip as a pop-up display in the determined location.

Another embodiment presented herein includes a non-transitory computer-readable storage medium containing instructions that, when executed by one or more processors, perform an operation for presenting an informative tip on a mobile device. The operation includes generating and presenting an informative tip upon receiving, at an application, a selection by a user of a text field in a user interface displayed on the mobile device. The operation includes retrieving a size of a display of the mobile device and a location and a size of a virtual keyboard of the mobile device from data stored on the mobile device, determining a location on the mobile device display to present an informative tip based on the retrieved mobile device display size and the retrieved virtual keyboard location and size, generating an informative tip that includes text content corresponding to the text field, and presenting the generated informative tip as a pop-up display in the determined location.

Another embodiment presented herein includes a system, comprising one or more processors and memory storing one or more applications, which, when executed on the one or more processors perform an operation for presenting an informative tip on a mobile device. The operation includes generating and presenting an informative tip upon receiving, at an application, a selection by a user of a text field in a user interface displayed on the mobile device. The operation includes retrieving a size of a display of the mobile device and a location and a size of a virtual keyboard of the mobile device from data stored on the mobile device, determining a location on the mobile device display to present an informative tip based on the retrieved mobile device display size and the retrieved virtual keyboard location and size, generating an informative tip that includes text content corresponding to the text field, and presenting the generated informative tip as a pop-up display in the determined location.

DETAILED DESCRIPTION

Embodiments presented herein provide techniques for presenting an informative tip that distinctly corresponds to a text field of a user interface displayed on a mobile device. Upon user selection of a text field presented in a user interface of an application or online service displayed on the user's mobile device, the application or service determines a location on the mobile device display to present an informative tip, generates an informative tip, and provides the generated informative tip in the determined location as a pop-up display on the mobile device.

In one embodiment, the determined location for the informative tip is directly above the top of a virtual keyboard of the mobile device, such that the informative tip appears to be attached to the top of the virtual keyboard. This location may be determined by determining a size of the mobile device display, and a location and size of a virtual keyboard of the mobile device. The size of the mobile device display and the location and size of the mobile device virtual keyboard may be retrieved from local storage on the mobile device.

In one embodiment, the informative tip may be generated by retrieving text content and presentation settings that correspond to the particular text field selected by the user. The text content and the presentation settings may be stored at a server, or they could also be stored locally on the mobile device. In one embodiment, the retrieved text content may distinctly correspond to both the particular text field selected, and the determined size of the mobile device display. The presentation settings may also distinctly correspond to the particular text field selected and/or the determined size of the mobile device display. In an alternative embodiment, there may be only one set of presentations settings that applies for all text fields and/or all mobile device display sizes.

Figure 1:
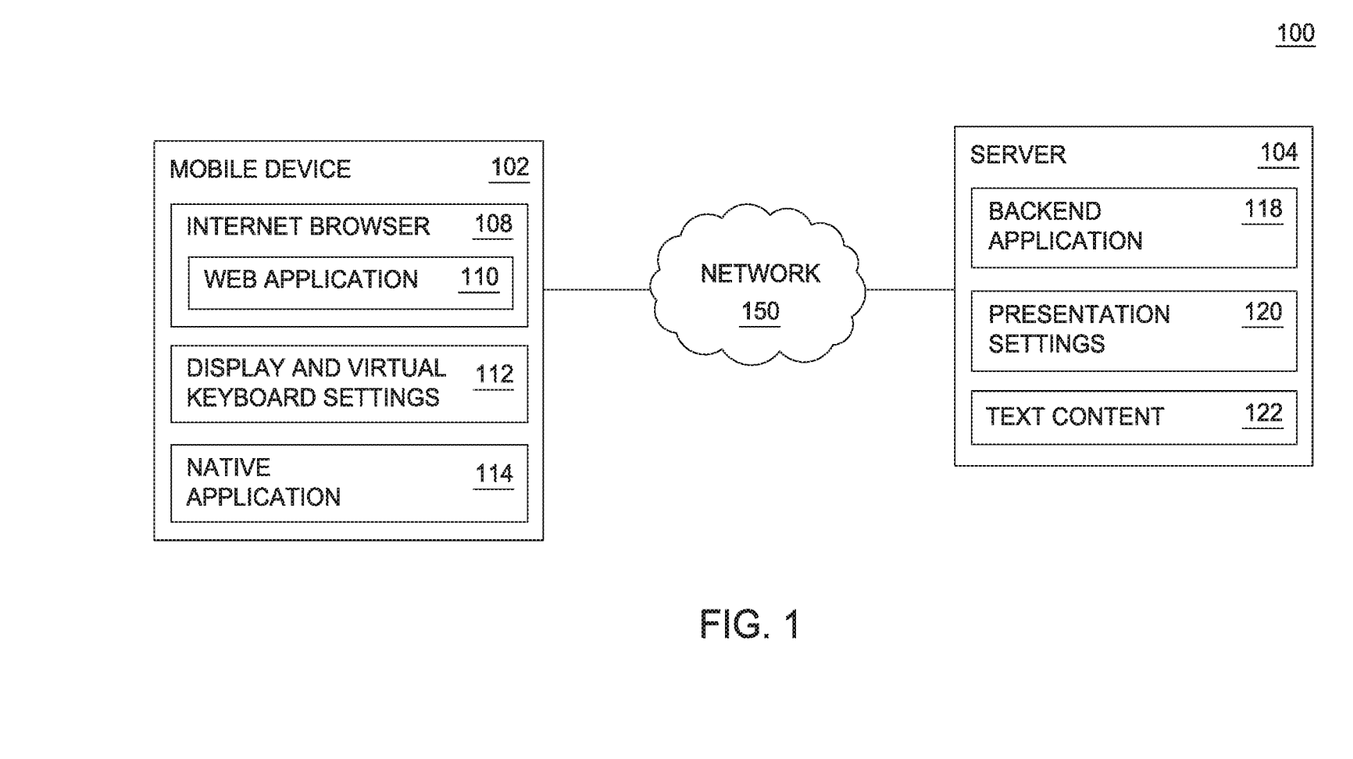
FIG. 1 illustrates an example computing environment that may be used to present an informative tip that distinctly corresponds to a text field of a user interface displayed on a mobile device, according to one embodiment.

FIG. 1 illustrates an example computing environment 100 for presenting an informative tip that distinctly corresponds to a text field of a user interface displayed on a mobile device according to one embodiment. As shown, computing environment 100 includes server 104 and mobile device 102 connected by network 150. A backend application 118 is executing on the server 104. The backend application 118 provides a service, such as a financial accounting or tax preparation service, to users. Presentation settings 120 and text content 122 may be created by an administrator using backend application 118, and are stored on the server 104. Presentation settings 120 include text presentation attributes, such as text font, text size, text color, etc. Text content 122 includes informative text corresponding to the data entry requested by different text fields.

A native application 114 is executing on the mobile device 102. Additionally, the mobile device 102 has an internet browser 108, and web application 110 that runs on the internet browser 108. In this case native means executing in the memory of the mobile device 102, while web means executing in the internet browser 108 on the mobile device 102. As such, a user can interact with either the native application 114 or the web application 110 to use the service provided by backend application 118. Of course, users may only use a native application 114 on their mobile device, while other users may only use a web application 110 on their mobile device. The mobile device 102 stores display and virtual keyboard settings 112.

Figure 2:
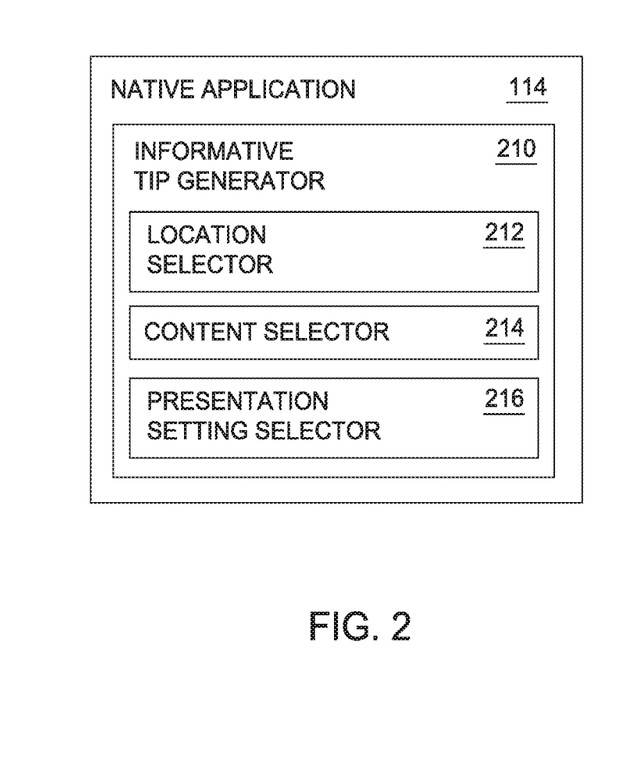
FIG. 2 illustrates components of a native application in the computing environment shown in FIG. 1, according to one embodiment.

FIG. 2 illustrates components of a native application 114 in the computing environment 100 shown in FIG. 1, according to one embodiment. As shown, native application 114 includes an informative tip generator 210. The informative tip generator 210 monitors user activity of the native application 114 to detect user selection of a text field in a user interface of native application 114 displayed on mobile device 102. Upon detecting that a user selects a text field, the informative tip generator 210 generates and presents a text-based informative tip to the user as a pop-up display on the mobile device 102. The informative tip may include any information or guidance for the user that is relevant to the selected text field (e.g., contextual information regarding data entry for that text field, data entry format, etc.). Upon detecting that the user has de-selected the text field, the informative tip generator 210 removes the informative tip from the display of the mobile device 102. The informative tip generator 210 includes location selector 212, content selector 214, and presentation style selector 216.

In one embodiment, the location selector 212 determines a size of the display of the mobile device 102, and a size and location of the virtual keyboard of the mobile device 102 by retrieving dimensions of the mobile device display and dimensions and a location of the virtual keyboard from the display and virtual keyboard settings 112 stored on mobile device 102. The location selector 212 selects a location on the mobile device display for presenting an informative tip based on the retrieved size of the mobile device display and based on the retrieved size and location of the virtual keyboard. For example, location selector 212 may select a location on the mobile device display that places the informative tip directly above the virtual keyboard, such that the informative tip appears attached to the top of the virtual keyboard. Thus, the informative tip would be placed such that the bottom of the informative tip is in the same location as the top of the virtual keyboard on the display of the mobile device 102.

In one embodiment, the text content of the informative tip may be determined by the content selector 214. For example, the content selector 214 may retrieve text content from a database of text content 122 stored at server 104 to include in an informative tip. The retrieved text content may include words, numbers, or symbols of text. Further, the retrieved text content may distinctly correspond to the selected text field. The database of text content 122 may store different text content that distinctly corresponds to different data fields. For example, the text content "USE THIS FORMAT: 123-45-6789" may correspond to a data field requesting the user's social security number. By contrast, the text content "USE THIS FORMAT: 555-555-5555" may correspond to a data field requesting the user's phone number.

Further, the retrieved text content may also distinctly correspond to the size of the mobile device display. The database of text content 122 may store different text content that distinctly corresponds to the size of the mobile device display in addition to the particular text field selected. For example, the text content "USE THIS FORMAT: 123-45-6789" may correspond to a data field requesting the user's social security number when the size of the user's mobile device satisfies a threshold. By contrast, the text content "123-45-6789" may correspond to the same data field requesting the user's social security number when the size of the user's mobile device does not satisfy the threshold. An administrator of backend application 118 may define the different text content stored in the database of text content 122.

The presentation style selector 216 retrieves presentation settings from a database of presentation settings 120 stored at server 104. The retrieved presentation settings may include text presentation attributes, such as text font, text size, text color, etc. The presentation settings retrieved from the database of presentation settings 120 stored at server 104 may distinctly correlate to the particular text field in the user interface displayed on mobile device 102 selected by the user. For example, a first text size, font, and color combination may correspond to a data field requesting the user's social security number, while a different text size, font, and color combination may correspond to a data field requesting the user's phone number. The presentation settings may alternatively or additionally distinctly correspond to the size of the mobile device display. In an alternative embodiment, there may be one set of presentation settings (e.g., text size, font, and color combination) applicable for all text fields and/or for all mobile device display sizes.

Figure 3:
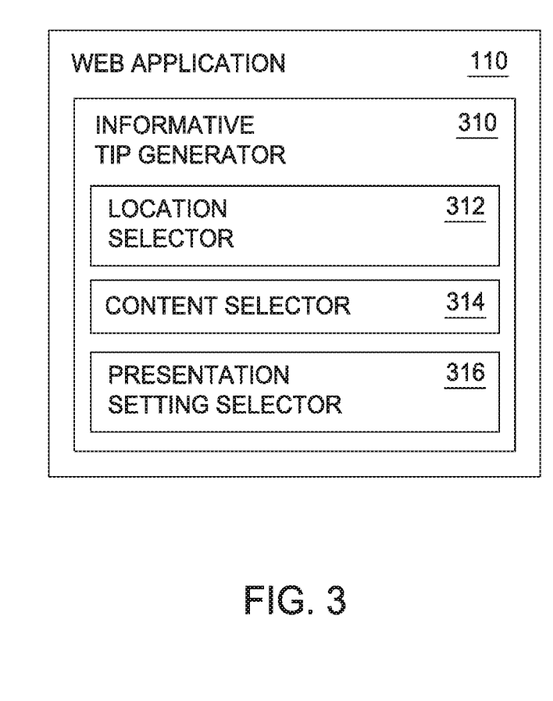
FIG. 3 illustrates components of a web application in the computing environment shown in FIG. 1, according to one embodiment.

FIG. 3 illustrates components of a web application 110 in the computing environment 100 shown in FIG. 1, according to one embodiment. Web application 110 includes an informative tip generator 310. The informative tip generator 310 monitors user activity of the web application 110 to detect user selection of a text field in a user interface of the web application 110 displayed on mobile device 102. Upon detecting that a user selects a text field, the informative tip generator 310 generates and presents a text-based informative tip to the user as a pop-up display on the mobile device 102. The informative tip may include any information or guidance for the user that is relevant to the selected text field (e.g., contextual information regarding data entry for that text field, data entry format, etc.). Upon detecting that the user has de-selected the text field, the informative tip generator 310 removes the informative tip from the display of the mobile device 102. The informative tip generator 310 includes location selector 312, content selector 314, and presentation style selector 316.

In one embodiment, the location selector 312 determines a size of the display of the mobile device 102, and a size and location of the virtual keyboard of the mobile device 102 by retrieving dimensions of the mobile device display and dimensions and a location of the virtual keyboard from the display and virtual keyboard settings 112 stored on mobile device 102. The location selector 312 selects a location on the mobile device display for presenting an informative tip based on the retrieved size of the mobile device display and based on the retrieved size and location of the virtual keyboard. For example, location selector 312 may select a location on the mobile device display that places the informative tip directly above the virtual keyboard, such that the informative tip appears attached to the top of the virtual keyboard. Thus, the informative tip would be placed such that the bottom of the informative tip is in the same location as the top of the virtual keyboard on the display of the mobile device.

In one embodiment, the text content of the informative tip may be determined by the content selector 314. For example, the content selector 314 may retrieve text content from a database of text content 122 stored at server 104 to include in an informative tip. The retrieved text content may include words, numbers, or symbols of text. The retrieved text content distinctly corresponds to the particular text field selected by the user. Further, the retrieved text content may distinctly correspond to the size of the mobile device retrieved by the location selector 312.

The presentation style selector 316 retrieves presentation settings from a database of presentation settings 120 stored at server 104. The retrieved presentation settings may include presentation attributes, such as text font, text size, text color, etc. The presentation settings retrieved from the database of presentation settings 120 stored at server 104 may distinctly correlate to the particular text field selected by the user. The presentation settings may alternatively or additionally distinctly correspond to the size of the mobile device display. In an alternative embodiment, there may be one set of presentation settings (e.g., text size, font, and color combination) applicable for all text fields and/or for all mobile device display sizes.

Figure 4:
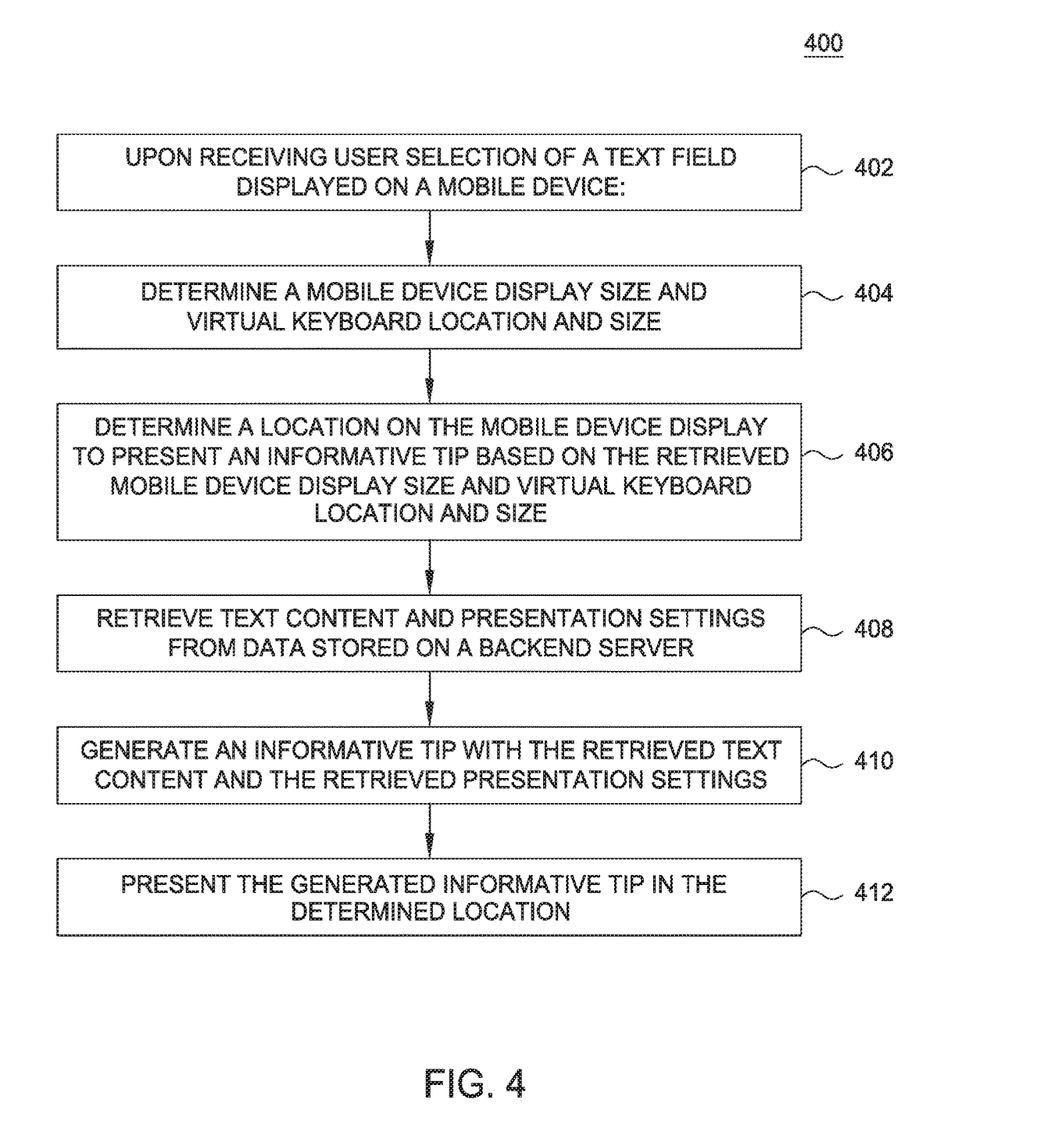
FIG. 4 illustrates a method for generating and presenting an informative tip on a mobile device, according to one embodiment.

FIG. 4 illustrates a method 400 for generating and presenting an informative tip on a mobile device 102, according to one embodiment. The method 400 begins at block 402, which indicates that blocks 404-412 are performed upon receiving user selection of a text field in a user interface of a native application 114 or web application 110 displayed on a mobile device 102. The user selection may include any action by the user with respect to the text field, such as tapping the text field, hovering a stylus over the text field, etc. At block 404, the method 400 includes determining a size of the device's display, and a location and size of the device's virtual keyboard. This information is retrieved from the display and virtual keyboard settings 112 stored on the mobile device 102. In one embodiment, the size of the virtual keyboard includes any toolbars or pop-ups that are presented on the display in conjunction with use of the virtual keyboard (e.g., a predictive text toolbar).

At block 406, the method 400 includes determining a location on the mobile device display to present an informative tip based on the retrieved size of the device display, and the retrieved location and size of the virtual keyboard of the device. The location may be determined relative to the virtual keyboard. For example, the location may be determined by choosing the location on the device display at which the informative tip would appear attached to the top of the virtual keyboard, such that the informative tip appears directly above the keyboard on the display, even if the user scrolls through the user interface. Placing all informative tips at the top of the virtual keyboard provides a consistent location on the device display for a user to look to receive informative tips. Further, because when the user selects a text field the user's attention is directed to the virtual keyboard to input data into the text field, the user's attention will be likewise be directed to the informative tip that appears attached to the top of the virtual keyboard. This placement of the informative tip could increase the likelihood that the informative tip will be viewed by the user.

At block 408, the method 400 includes retrieving text content and presentation settings. The text content and presentation settings may be retrieved from the database of text content 122 and the database of presentation settings 120 stored on backend server 104. The retrieved text content may include information that could be helpful to the user when inputting data into the particular text field selected by the user, and the presentation settings may include text presentation styles, such as text color, size, font, etc. The text content and presentation settings retrieved at block 408 may distinctly correspond to the particular text field selected by the user. For example, if a first text field is selected, text content corresponding to the first text field is retrieved from the database of text content 122 stored on the backend server 104. If a second text field is selected, text content corresponding to the second text field is retrieved from the database of text content 122 stored on the backend server 104.

The text content may also distinctly correspond to the retrieved display size of the device 102. For example, if a first text field is selected, text content corresponding to both the first text field and the retrieved mobile device display size may be stored at and retrieved from the database of text content 122 at backend server 104. If a second text field is selected, informative text content corresponding to both the second text field and the retrieved mobile device display size may be stored at and retrieved from the database of text content 122 at backend server 104. As such, the amount of text content retrieved for a particular text field may be dependent upon and proportional to the size of the mobile device display (e.g., a larger amount of text content may be stored and retrieved for particular text field for mobile devices with a larger display than for mobile devices with a smaller display). Like the retrieved text content, the retrieved presentation settings may also be tailored according to the particular text field selected and/or the size of the mobile device display. However, in one embodiment, the presentation settings in the database of presentation settings 120 may not correspond distinctly to the particular text field selected and/or mobile device display size, but rather, they may be consistent across all text fields and/or all mobile device display sizes.

At block 410, the method 400 includes generating an informative tip with the text content and presentation settings retrieved at block 408. For example, the generated informative tip may include the retrieved text content in the text size, text font, and text color in the retrieved presentation settings. At block 412, the method 400 includes presenting the informative tip generated at block 410 in the location determined at block 406. The generated informative tip may be presented on the device display as a pop-up display. The informative tip may be presented as long as the user has the text field selected. As soon as the user de-selects the text field or selects a different text field, the informative tip may be removed.

In one embodiment, once an informative tip has been generated for a particular text field according to the method 400, the informative tip may be locally saved at the mobile device 102 for a certain amount of time or until the user navigates away from the user interface. If the user re-selects the text field during that amount of time and/or while the user is still viewing the user interface, the informative tip may be retrieved from local storage and presented to the user without having to re-create the informative tip using method 400. However, once the amount of time has passed, and/or once the user has navigated away from the user interface, if the user re-selects the text field, the method 400 will have to be performed again to re-create an informative tip for that text field.

Figure 5:
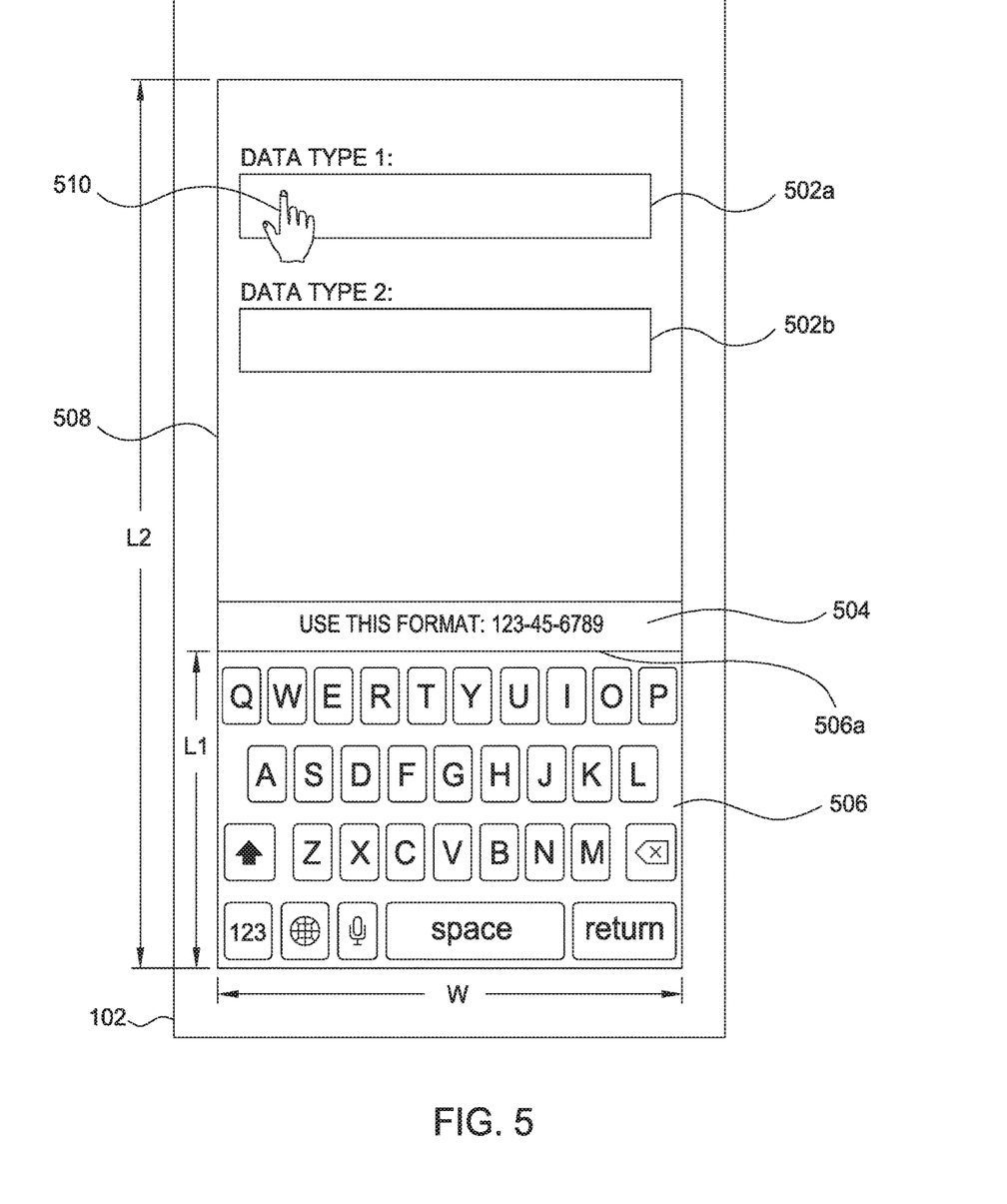
FIG. 5 illustrates a user interface of an application presented on a mobile device display, according to one embodiment.

FIG. 5 illustrates a user interface of an application on a mobile device 102, according to one embodiment. The mobile device 102 has a display 508. In this embodiment, the size of the rectangular display 508 is the rectangular area having a width W and a length L2. A virtual keyboard 506 is presented in the display 508. In this embodiment, the virtual keyboard 506 is located adjacent to the bottom of the display, and the size of the rectangular virtual keyboard 506 is the area having a width W and a length L1. In one embodiment, the size of the virtual keyboard 506 may include a toolbar attached to the keyboard (not shown), such as a predictive text toolbar. If such a toolbar (not shown) is attached to the top of the virtual keyboard 506, the top of the toolbar would be considered the top of the virtual keyboard 506.

The user interface displayed on the display 508 of the mobile device 102 in FIG. 5 has two possible data fields 502a, 502b for data entry. The user has selected 510 the first data field 502a corresponding to a first data type. An informative tip 504 corresponding to the selected data field 502a is also presented on the display 508. This informative tip 504 may have been generated and presented according the method 400 described above. The informative tip 504 appears attached to a top 506a of the virtual keyboard 506. The informative tip 504 may be removed if the user de-selects the data field 502a, by selecting any area on the user interface that does not include a data field 502a, 502b, and/or the informative tip 504 may be removed if the user selects a different data field 502b corresponding to a different data type.

Figure 6:
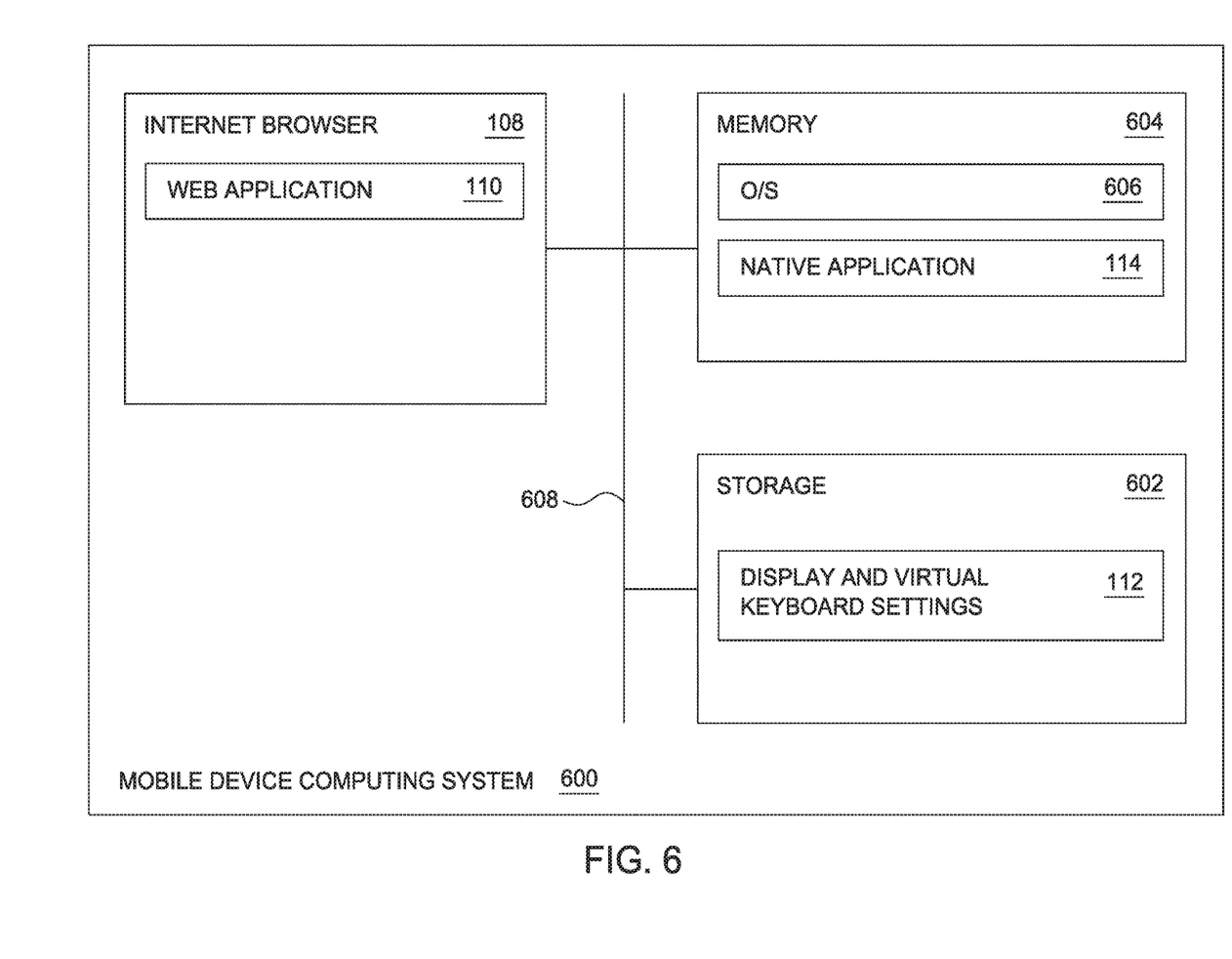
FIG. 6 illustrates an example mobile device computing system for presenting an informative tip that distinctly corresponds to a text field of a user interface displayed on a mobile device, according to one embodiment.

FIG. 6 illustrates an example mobile device computing system 600 for presenting an informative tip that distinctly corresponds to a text field of a user interface displayed on a mobile device, according to one embodiment. The mobile device computing system 600 includes an internet browser 108, a memory 604, storage 602, and an interconnect 608. The memory 604 includes the 0/S 606 for the mobile device 102, and the native application 114. The user of the mobile device 102 can use the native application 114 to access the service provided by backend application 118 on server 104. The storage 602 includes the display and virtual keyboard settings 112 for the device 102. The display and virtual keyboard settings 112 include the size of the display of the mobile device 102 and the size and location of the virtual keyboard of the mobile device 102. The internet browser 108 executes the web application 110. The user can access the service provided by backend application 118 on server 104 by using the web application 110 provided by in the internet browser 108. The native application 114 or the web application 110 can generate and present an informative tip that distinctly corresponds to a text field of a user interface displayed on the mobile device 102 according to the technique disclosed herein.

Figure 7:
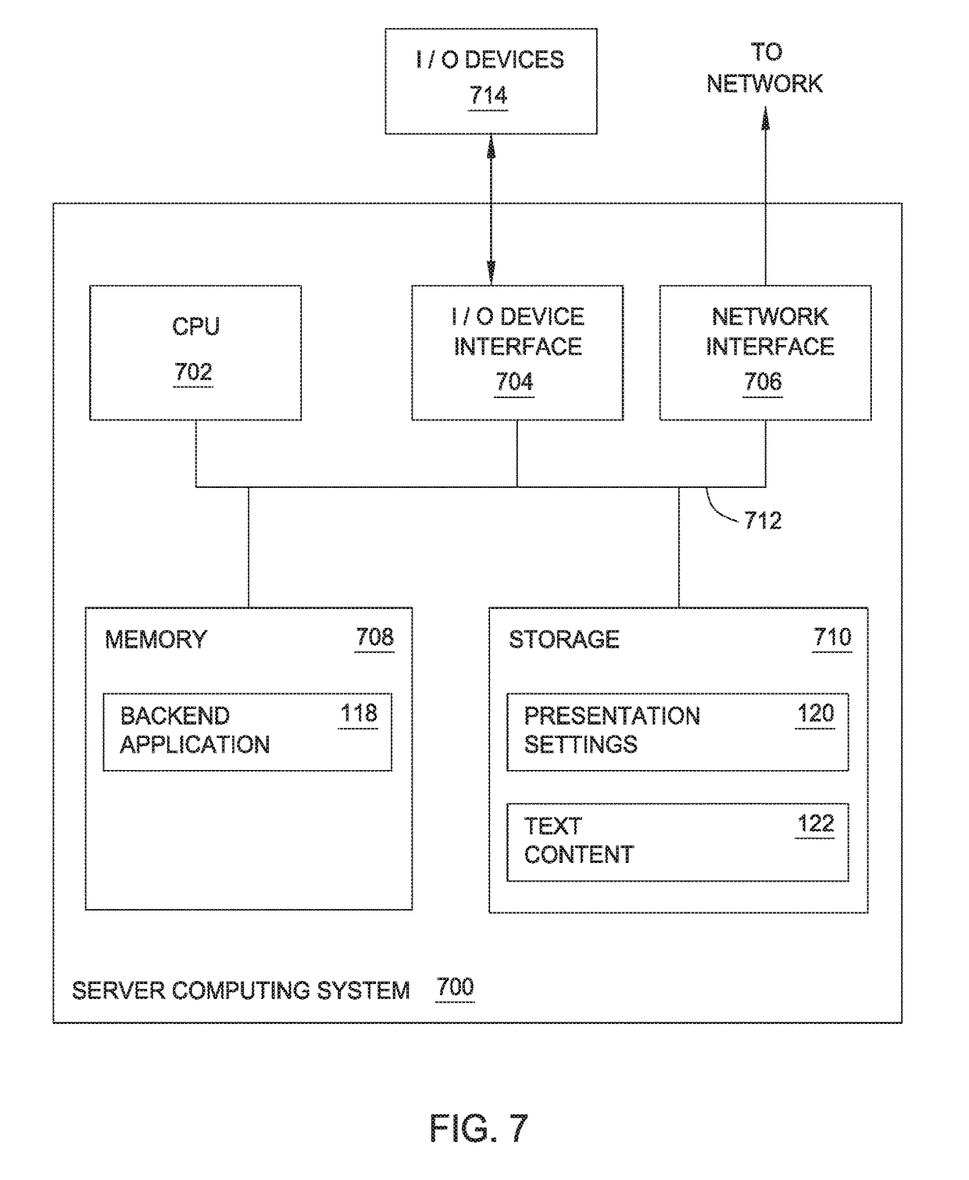
FIG. 7 illustrates an example server computing system for presenting an informative tip that distinctly corresponds to a text field of a user interface displayed on a mobile device, according to one embodiment.

FIG. 7 illustrates an example server computing system 700 for presenting an informative tip that distinctly corresponds to a text field of a user interface displayed on a mobile device, according to one embodiment. As shown, the computing system 700 includes, without limitation, a central processing unit (CPU) 702, one or more I/O device interfaces 704 which may allow for the connection of various I/O devices 714 (e.g., keyboards, displays, mouse devices, pen input, etc.) to the computing system 700, network interface 706, a memory 708, storage 710, and an interconnect 712.

CPU 702 may retrieve and execute programming instructions stored in the memory 708. Similarly, the CPU 702 may retrieve and store data residing in the storage 710. The interconnect 712 transmits programming instructions and data, among the CPU 702, I/O device interface 704, network interface 706, memory 708, and storage 710. CPU 702 can represent a single CPU, multiple CPUs, a single CPU having multiple processing cores, and the like. Additionally, the memory 708 represents random access memory. Furthermore, the storage 710 may be a disk drive. Although shown as a single unit, the storage 710 may be a combination of fixed or removable storage devices, such as fixed disc drives, removable memory cards or optical storage, network attached storage (NAS), or a storage area-network (SAN).

As shown, memory 708 includes backend application 118 that provides a service, such as a financial accounting or tax preparation service to users. The backend application 118 is also used by an administrator to create and store presentations settings 120 and text content 122 in storage 710 that can be retrieved and used by a native application 114 or web application 110 at a mobile device when generating informative tips.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for presenting an informative tip on a mobile device, the method comprising:
   receiving, at an application, a selection by a user of a text field in a user interface displayed on the mobile device;
   retrieving a mobile device display size from mobile device data stored on the mobile device;
   determining a virtual keyboard location and a virtual keyboard size associated with the application;
   determining an informative tip location on the mobile device display based on the retrieved mobile device display size and the determined virtual keyboard location and virtual keyboard size;
   generating an informative tip by:

identifying a first text content option and a second text content option associated with the text field selected by the user;
comparing the mobile device display size to a size threshold; and
selecting between the first text content option and the second text content option to include in the informative tip based on whether the mobile device display size satisfies the size threshold; and
displaying the generated informative tip as a pop-up user interface element on the mobile device display in the determined informative tip location,
wherein the informative tip is displayed directly above the virtual keyboard location without overlapping any of a virtual keyboard displayed on the mobile device display, and
wherein the informative tip is as wide as the mobile device display.

2. The method of claim 1, wherein the second text content option comprises a larger amount of text content than the first text content option.

3. The method of claim 1, further comprising, prior to generating the informative tip:
retrieving the first text content option or the second text content option corresponding to the text field from a database of text content; and
retrieving one or more presentation settings from a database of presentation settings, wherein the informative tip is generated using the retrieved one or more presentation settings.

4. The method of claim 3, wherein the application is executing on the mobile device, and wherein the database of text content and the database of presentation settings are stored at a backend server.

5. The method of claim 3, wherein the retrieved one or more presentation settings comprise at least one of text font, text size, or text color, and wherein the first text content option and the second text content option comprise at least one of a word, a number, or a symbol.

6. The method of claim 1, wherein determining the informative tip location further comprises: determining a location on the mobile device display at which the presented informative tip would appear attached to a top of the virtual keyboard.

7. The method of claim 1, further comprising: upon receiving, at the application, a de-selection by the user of the text field or a selection by the user of a second text field in the user interface displayed on the mobile device, removing the generated informative tip from the mobile device display.

8. The method of claim 1, further comprising: saving the generated informative tip in a local storage on the mobile device.

9. A non-transitory computer-readable storage medium containing instructions that, when executed by one or more processors, perform an operation for presenting an informative tip on a mobile device, the operation comprising:
receiving, at an application, a selection by a user of a text field in a user interface displayed on the mobile device;
retrieving a mobile device display size from mobile device data stored on the mobile device;
determining a virtual keyboard location and a virtual keyboard size associated with the application;
determining an informative tip location on the mobile device display based on the retrieved mobile device display size and the determined virtual keyboard location and virtual keyboard size;
generating an informative tip by:
identifying a first text content option and a second text content option associated with the text field selected by the user;
comparing the mobile device display size to a size threshold; and
selecting between the first text content option and the second text content option to include in the informative tip based on whether the mobile device display size satisfies the size threshold; and
presenting the generated informative tip as a pop-up user interface element on the mobile device display in the determined informative tip location,
wherein the informative tip is displayed directly above the virtual keyboard location without overlapping any of a virtual keyboard displayed on the mobile device display, and
wherein the informative tip is as wide as the mobile device display.

10. The non-transitory computer-readable storage medium of claim 9, wherein the second text content option comprises a larger amount of text content than the first text content option.

11. The non-transitory computer-readable storage medium of claim 9, further comprising, prior to generating the informative tip:
retrieving the first text content option or the second text content option corresponding to the text field from a database of text content; and
retrieving one or more presentation settings from a database of presentation settings, wherein the informative tip is generated using the retrieved one or more presentation settings.

12. The non-transitory computer-readable storage medium of claim 11, wherein the application is executing on the mobile device, and wherein the database of text content and the database of presentation settings are stored at a backend server.

13. The non-transitory computer-readable storage medium of claim 11, wherein the retrieved one or more presentation settings comprise at least one of text font, text size, or text color, and wherein the first text content option and the second text content option comprise at least one of a word, a number, or a symbol.

14. The non-transitory computer-readable storage medium of claim 9, wherein determining the informative tip location further comprises: determining a location on the mobile device display at which the presented informative tip would appear attached to a top of the virtual keyboard.

15. The non-transitory computer-readable storage medium of claim 9, further comprising: upon receiving, at the application, a de-selection by the user of the text field or a selection by the user of a second text field in the user interface displayed on the mobile device, removing the generated informative tip from the mobile device display.

16. The non-transitory computer-readable storage medium of claim 9, further comprising: saving the generated informative tip in a local storage on the mobile device.

17. A system, comprising:
one or more processors; and
memory storing one or more applications, which, when executed on the one or more processors perform an operation for presenting an informative tip on a mobile device, the operation comprising:
receiving, at an application, a selection by a user of a text field in a user interface displayed on the mobile device;

retrieving a mobile device display size from mobile device data stored on the mobile device;

determining a virtual keyboard location and a virtual keyboard size associated with the application;

determining an informative tip location on the mobile device display based on the retrieved mobile device display size and the determined virtual keyboard location and virtual keyboard size;

generating an informative tip by:

identifying a first text content option and a second text content option associated with the text field selected by the user;

comparing the mobile device display size to a size threshold; and selecting between the first text content option and the second text content option to include in the informative tip based on whether the mobile device display size satisfies the size threshold; and presenting the generated informative tip as a pop-up user interface element on the mobile device display in the determined informative tip location, wherein the informative tip is displayed directly above the virtual keyboard location without overlapping any of a virtual keyboard displayed on the mobile device display, and wherein the informative tip is as wide as the mobile device display.

18. The system of claim 17, wherein the second text content option comprises a larger amount of text content than the first text content option.

19. The system of claim 17, further comprising, prior to generating the informative tip:

retrieving the first text content option or the second text content option corresponding to the text field from a database of text content; and retrieving one or more presentation settings from a database of presentation settings, wherein the informative tip is generated using the retrieved one or more presentation settings.

20. The system of claim 19, wherein the application is executing on the mobile device, and wherein the database of text content and the database of presentation settings are stored at a backend server.

* * * * *